April 23, 1946. W. A. GEIGER 2,399,110

SHOCK ABSORBING MECHANISM

Filed Jan. 28, 1944

Inventor
William A. Geiger
By George I. Haight
Atty.

Patented Apr. 23, 1946

2,399,110

UNITED STATES PATENT OFFICE 2,399,110

SHOCK ABSORBING MECHANISM

William A. Geiger, Chicago, Ill., assignor to William P. Sidley, M. F. Back, Albert P. Withall, Edwin C. Austin, and George A. Johnson, all of Chicago, Ill., and Alice T. Miner, Chazy, N. Y., as trustees of The William H. Miner Foundation Application January 28, 1944, Serial No. 520,033

6 Claims. (Cl. 213—32)

My invention relates to improvements in friction shock absorbing mechanism, and more particularly to the type of friction shock absorbers used in the draft gear of railway cars.

One of the objects of my invention is to overcome the objections to the use of a retainer bolt by the provision of a structure embodying all of the advantages of friction mechanisms with the spring under preliminary compression without the use of a retainer bolt.

A further object is to provide a boltless friction shock absorber wherein the parts are so constructed as to permit of ease and simplicity of assembly, and wherein the parts are interlocked in a manner which retains the spring means and friction parts under initial or preliminary compression irrespective of the frequency and severeness of the shocks to which it is subjected.

Other objects of my invention will appear from the following description and claims in connection with the accompanying drawing which illustrates one embodiment of the invention.

Referring to the drawing.

Figure 1:
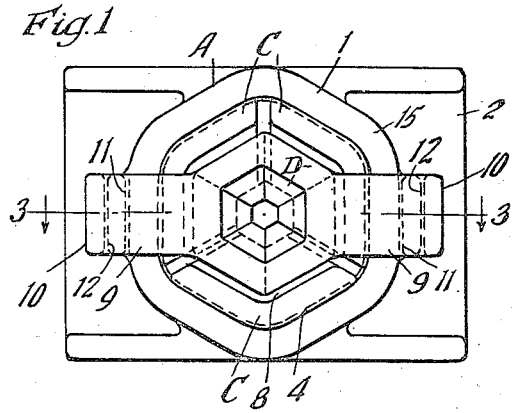
Fig. 1 is a front end view of a shock absorbing mechanism embodying the invention.
Figure 2:
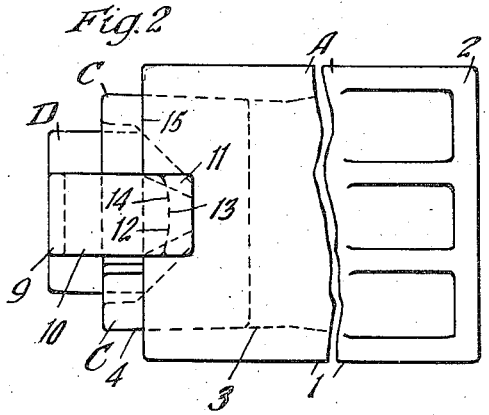
Fig. 2 is a side elevation of the structure shown in Fig. 1.
Figure 3:
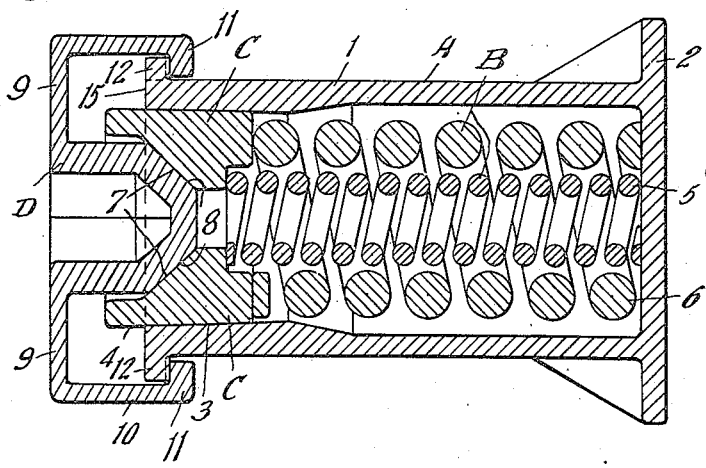
Fig. 3 is a horizontal longitudinal section on substantially the line 3—3 of Fig. 1.

The shock absorbing mechanism shown in the drawing comprises the casing or shell A, spring resistance means B, friction shoes C, and a friction wedge D.

The casing or shell A in the present structure is a hollow tubular member 1 having a rectangularly shaped base 2 which closes one end of the casing and which bears against the rear stops when the device is used as the shock absorbing mechanism in railway car draft rigging. The casing is open at its other end and is preferably hexagonal in cross section and its inner surfaces at the open end are tapered to provide friction faces 3 which cooperate with the external faces 4 of the friction shoes C.

The shoes are in the present structure three in number and each arranged to occupy two adjacent angularly related faces 3 of the shell. These shoes, as is well understood, move longitudinally of the shell in frictional engagement with the friction faces thereof to provide the necessary high frictional shock absorbing capacity in addition to the cushioning effect of the spring resistance B. The spring resistance in the present structure comprises an inner and an outer coil spring 5 and 6, which are concentrically arranged in the casing and bear at their ends against the friction shoes and the bottom wall of the casing respectively.

The wedge member D is tapered at its inner end and is hexagonal in section to provide angularly related wedge faces 7 which bear against the corresponding wedge faces 8 in the shoes, so that when the wedge is subjected to shocks of draft or buff it expands or forces the shoes outwardly into frictional engagement with the friction faces of the casing.

Heretofore in devices of this character, it has been the practice to utilize a retaining bolt which extended through the casing, springs, and wedge for the purpose of holding the parts together and maintaining the springs under an initial compression to insure proper contact between the friction parts and take up wear which occurs in service. But these bolts are subject to extremely severe strain upon the release action of the parts, and this results in either breaking the bolts or stretching them beyond their elastic limit.

In order, therefore, to overcome these objections, I eliminate the bolt entirely and employ instead an interlocking connection between the casing and the wedge member which allows proper movement outwardly of the wedge member and provide sturdy limit stops against outwardly or rebound movement beyond normal. In the present structure, the wedge member has two oppositely disposed laterally extending arms 9 which have rearwardly extensions 10 overlying the exterior end portion of the casing. The ends of these extensions have inwardly disposed lugs 11 forming shoulders adapted to engage behind segmental shoulder lugs 12 on the casing and thus provide limit stops against the outward movement of the wedge beyond normal.

Figure 4:
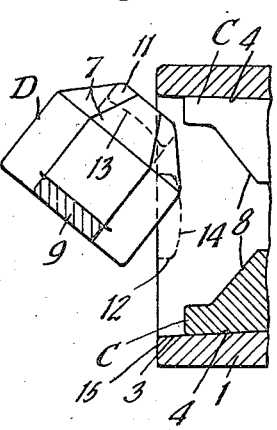
Fig. 4 is a detail sectional view of the end portion of the structure, illustrating the method of assembly of the parts.

The assembly of the parts may be accomplished in either of two ways. In either case, the springs and friction shoes are first assembled in place in the casing and then forced inwardly sufficiently by any suitable tool to initially compress the springs and to provide clearance for the entrance of the wedge. In Fig. 4, the structure is arranged so that the wedge and arms can be rotated on an axis transverse to the longitudinal axis of the structure. In this case, the shoulder faces 13 of lugs 11, and faces 14 of lugs 12 are curved on a suitable radius to facilitate the rotation of the arms and lugs 11 into place. After the part is rotated to engage the lugs, the springs are released and allowed to force the shoes and wedge outwardly, the parts being so proportioned that in normal position the springs will still be under sufficient compression to securely hold the parts in contact.

Figure 5:
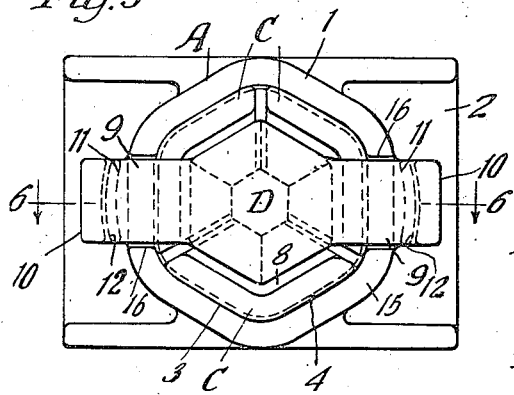
Fig. 5 is an end view similar to Fig. 1, of a modification of the structure.
Figure 6:
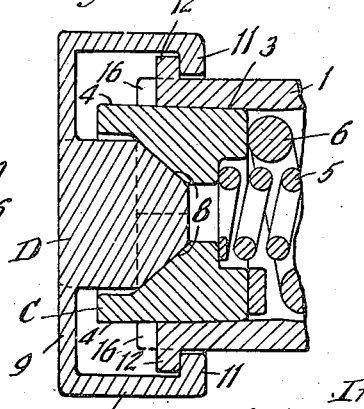
Fig. 6 is a sectional view on the line 6—6 of Fig. 5.

In the form shown in Figs. 5 and 6, the wedge is entered in axial alignment, and when the lugs 11 are beyond the lugs 12 the wedge and arms are rotated on that axis until the lugs 11 and 12 are aligned and in engagement. In either of these forms, the wedge and lugs cannot be accidentally displaced because of the fact that the wedge and shoes are hexagonal and become locked against rotation.

In either of these forms, the outer end of the wedge bears against the forward or front follower plate of the draft rigging, and the outer end face of the wedge is spaced from the end margin 15 of the casing to provide for the proper movement of the wedge. However, the end margin of the casing forms a limit stop against the compression of the springs to solid condition. In the form shown in Figs. 5 and 6, the end margin 15 of the casing is provided with notches 16 slightly deeper than the thickness of the arms 9 so that the arms may enter these notches and not be subject to the shock.

I have herein shown and described what I now consider the preferred manner of carrying out the invention. It will be understood that changes may be made in the construction, operation and arrangement of the various parts, without departing from the spirit of the invention, and it is understood that I contemplate such changes as fairly fall within the scope of the appended claims.

I claim:

1. In a friction shock absorber of the class described, the combination of a hollow casing, shock cushioning means positioned within the casing and extending beyond one end thereof and movable into said casing, said casing having adjacent said end laterally extending diametrically opposite segmental shoulder lugs, and arms on said extended portion of the cushioning means overlying the end portion of the casing and having shoulder lugs engaging the lugs on the casing to limit the outward movement of said cushioning means.

2. In a shock absorbing mechanism of the class described, the combination of a hollow casing open at one end and having exterior, laterally extending diametrically opposite segmental lugs adjacent said open end, shock cushioning means movable within the casing having an end portion extending beyond the open end of said casing, and means for limiting the outward movement of said cushioning means, comprising integral arms on said extended end portion of the cushioning means overlying the end of the casing and having lugs adapted to be brought into engagement with the lugs on the casing by the rotation of said extended portion and arms on an axis transverse to the longitudinal axis of the casing.

3. In a shock absorbing mechanism of the class described, the combination of a hollow casing open at one end and having diametrically opposite segmental shoulder lugs outstanding from the casing adjacent its open end, friction shoes in engagement with the interior wall of said casing and movable lengthwise of the casing, spring resistance means within the casing between the said shoes and the bottom wall of the casing, a wedge member in engagement with the shoes and extended beyond the open end of the casing, and interlocking means between the wedge and the casing for limiting the outward movement of said wedge, comprising laterally and rearwardly extending arms on the wedge overlying the end portion of the casing and having instanding lugs in engagement with the segmental lugs on the casing.

4. In a shock absorbing mechanism of the class described, the combination of a hollow casing open at one end and having segmental shoulder lugs outstanding from the casing adjacent its open end, friction shoes in engagement with the interior wall of said casing and movable lengthwise of the casing, spring resistance means within the casing between the said shoes and the bottom wall of the casing, a wedge member in engagement with the shoes and extended beyond the open end of the casing, and interlocking means between the wedge and the casing for limiting the outward movement of said wedge, comprising laterally and rearwardly extending arms on the wedge overlying the end portion of the casing and having instanding lugs in engagement with the segmental lugs on the casing, said lugs having curved inter-engaging faces permitting the wedge and lugs to be rotated into inter-engagement in assembling the parts.

5. In a shock absorbing mechanism of the class described, the combination of a hollow casing open at one end and having segmental shoulder lugs outstanding from the casing adjacent its open end, friction shoes in engagement with the interior wall of said casing and movable lengthwise of the casing, spring resistance means within the casing between the said shoes and the bottom wall of the casing, a wedge member in engagement with the shoes and extended beyond the open end of the casing, and interlocking means between the wedge and the casing for limiting the outward movement of said wedge, comprising laterally and rearwardly extending arms on the wedge overlying the end portion of the casing and having instanding lugs in engagement with the segmental lugs on the casing, said lugs having curved inter-engaging faces permitting the wedge and lugs to be rotated into inter-engagement in assembling the parts, said wedge and shoes having angularly related engaging wedge faces to prevent accidental rotation of the wedge after assembling of the parts.

6. In a shock absorbing mechanism of the class described, the combination of a hollow casing open at one end and having angularly related interior friction faces, friction shoes in said casing having angularly related friction faces in engagement with the friction faces of said casing and movable lengthwise of the casing, segmental lugs on the exterior of the casing adjacent the open end thereof, a wedge member cooperating with the shoes in axial alignment with the shoes and the casing, arms on said wedge having lugs adapted for engagement with the segmental lugs on the casing, said lugs being adapted to be brought into engagement with said segmental lugs by the rotation of the wedge on an axis transverse to the longitudinal axis of the casing.

WILLIAM A. GEIGER.